United States Patent

Backlund

[15] 3,689,607

[45] Sept. 5, 1972

[54] UREA PRILLING

[72] Inventor: Peter Stanley Backlund, Anaheim, Calif.

[73] Assignee: Union Oil Company of California, Los Angeles, Calif.

[22] Filed: Oct. 26, 1970

[21] Appl. No.: 84,246

[52] U.S. Cl. ..........................264/13, 264/28, 264/37
[51] Int. Cl. ................................................B01j 2/06
[58] Field of Search............................264/13, 28, 37

[56] References Cited

UNITED STATES PATENTS

| | | | |
|---|---|---|---|
| 3,446,877 | 5/1969 | Endler | 264/13 |
| 2,528,407 | 10/1950 | Yeandle | 264/5 |
| 3,516,879 | 6/1970 | Globus | 264/28 |

*Primary Examiner*—Robert F. White
*Assistant Examiner*—J. R. Hall
*Attorney*—Milton W. Lee, Richard C. Hartman, Lannas S. Henderson, Dean Sandford and Robert E. Strauss

[57] ABSTRACT

Particulate solids of water-soluble, fertilizer materials are prepared by dispersing a substantially anhydrous spray of molten and discrete droplets of the fertilizer material into a liquefied, volatile, cooling medium. Suitable cooling media include liquefied air, nitrogen, ammonia, carbon dioxide, or $C_1$ to about $C_5$ alkanes and halogenated derivatives thereof. The molten fertilizer material is preferably dispersed as discrete droplets having sizes from about 0.04 to about 0.30 inch by spraying the molten material into the liquefied cooling medium. The material is permitted to reside in the cooling medium a sufficient time to cool the material to below its freezing point and thereby form the particulate solids which are thereafter separated from the liquid. Any vaporized liquid can be recovered and refrigerated for reuse in the process. Urea is a preferred fertilizer material.

13 Claims, No Drawings

UREA PRILLING

DESCRIPTION OF THE INVENTION

This invention relates to a method for the preparation of particulate solids of water soluble, fertilizer materials.

Particulate fertilizer solids are commonly prepared by concentration and crystallization of the fertilizer material from the aqueous crude reaction product obtained in its synthesis. The crystals are employed as such or, in conventional practice, the crystals are melted and the molten fertilizer material is sprayed as dispersed, finely divided droplets which are permitted to fall, countercurrently, to a stream of dry, cool air in a prilling tower. The fertilizer material solidifies in its free fall through the air stream and is recovered from the bottom of the prilling tower in a solid, prill form. In another technique, which has been employed experimentally, droplets of molten urea are sprayed into a hydrocarbon liquid which quenches the molten urea to solidify it.

A number of problems are encountered with the aforedescribed techniques. Solid crystals are generally irregular in shape and are not satisfactory for normal handling, storage, or shipment. Accordingly, most of the industrial and agricultural grades of these materials are formed into prills in the aforementioned prilling towers. These prilling towers, however, are large structures and the prills which are produced are generally small in size, having average particle diameters from about 0.04 to about 0.09 inch. Although the molten material could be sprayed as larger droplets to form larger particles, these larger particles would require a longer free fall for sufficient cooling to solidify. This would require a prohibitively high tower. As a result, the conventional prilling operation is relatively inflexible and can not be used to produce prills of large diameters. The solids which are commonly produced by prilling operations also have a marked tendency to agglomerate or form cakes in storage and additives must often be added to the solids to inhibit this tendency.

It has been suggested that prills of larger diameter could be manufactured by the quenching of droplets of the molten material, e.g., urea, in a suitable liquid such as a hydrocarbon which is a liquid at ambient conditions. This hydrocarbon is cooled sufficiently to chill the molten urea droplets and solidify them. Difficulties can be encountered with this procedure, however, since the prills which are produced by this process can retain a coating of the normally liquid hydrocarbon and must be washed to insure that no hydrocarbon contamination of the product results. Additionally, when the technique is applied to urea prilling, adducts with normally liquid hydrocarbons can be formed and such adducts prevent complete washing of the hydrocarbon from the urea.

It is, therefore, an object of this invention to provide a method for the production of solids of fertilizer materials which are suitable for shipping, storing and handling.

It is also an object of this invention to provide a method for the production of solids of fertilizer materials which have enhanced resistance to caking.

It is a further object of this invention to provide a method for the production of solids of fertilizer materials which can produce particulate solids of widely varied sizes.

Other and related objects will be apparent from the following description of the invention.

The aforementioned objects can be achieved by the method of this invention which comprises the use of a liquefied, volatile, cooling medium to chill the liquid droplets to below the freezing point of molten fertilizer material and thereby form the particulate solids. The method is practiced by dispersing molten and discrete droplets of a substantially anhydrous fertilizer material into the volatile liquid. The liquid employed should be one in which the fertilizer material is inert, insoluble and substantially non-adsorptive, and the liquid should have a boiling point at atmospheric pressure which is less than about 85°C. Preferably, the cooling medium is a gas at ambient conditions. The inertness, insolubility and non-adsorptivensss can generally be achieved by use of an essentially non-polar material as the cooling medium. Similarly, the tendency for adduct formation between the hydrocarbons, when these are the cooling media, and urea can be obviated by use of low molecular weight hydrocarbons, e.g., the $C_1$ to about $C_5$ alkanes. The liquid can be maintained by appropriate refrigeration at any suitable temperature below its boiling point. Suitable liquids that can be used include liquefied, volatile materials such as liquefied air, nitrogen, ammonia, carbon dioxide, $C_1$ to about $C_5$ alkanes and halogenated derivatives thereof.

While the invention, in its preferred form, is applied to the solidification of molten urea for the production of particulate urea solids, it can also be applied to the solidification of molten streams of any water-soluble fertilizer material. As used herein, fertilizer material is not intended as a limiting statement of intended use of the material, but rather, as a convenient manner of identification. Thus industrial grades of fertilizers such as explosive grades of ammonium nitrate or polymerizable grades of urea are also included herein. Examples of these materials include various ammonium and potassium salts such as ammonium sulfate, ammonium nitrate, ammonium chloride, potassium chloride, potassium nitrate, potassium sulfate, etc., urea, or mixtures thereof. The molten salts should be substantially anhydrous, i.e., relatively free of moisture, containing less than about 10 percent, preferably less than 2 percent, and most preferably less than about 0.5 percent water. The molten, water soluble, fertilizer material can also contain various impurities in minor or trace amounts, such as congeneric impurities which are associated with the production of the material, e.g., biuret in urea, chloride salts in potassium nitrate, etc.

The stream of molten, water-soluble fertilizer material is broken up into discrete droplets and discharged into contact with the liquefied, volatile chilling medium. Any suitable technique can be used for the dispersion of the molten stream of fertilizer material into discrete droplets, including the spraying of the molten material through a spray nozzle or through a plurality of small orifices, etc. Alternatively, the stream can be discharged against a screen or a moving surface which will break the stream into discrete droplets.

The droplets, upon their formation, are permitted to fall or are impelled into contact with the liquefied, volatile, cooling medium. Preferably, this contacting is effected by introducing the molten stream of water-soluble fertilizer material into a spray header having a plurality of small diameter orifices which are directed towards the body of liquefied, volatile, cooling medium whereby the droplets, immediately upon their formation, are discharged into contact with the cooling medium. In another embodiment, the spray header can be submerged in the cooling medium.

Various materials which are a gas or are very volatile at ambient conditions can be used as the cooling medium. Examples of these include liquefied air, liquefied nitrogen, liquefied ammonia, liquefied carbon dioxide, liquefied $C_1$ to about $C_5$ alkanes, e.g., methane, ethane, propane, butane, isobutane, pentane, isopentane, etc. Halogenated derivatives of these alkane hydrocarbons containing up to about six halogen atoms per molecule can also be employed such as methyl chloride, ethyl chloride, ethyl bromide, chloroform, ethylene chloride, difluorodichloroethane, fluorodichlorobutane, carbon tetrachloride, etc. The aforementioned are examples of suitable media in which the fertilizer material is inert, insoluble and substantially nonabsorptive so that no contamination of the product will result from its contact with the cooling medium. The liquid medium which is employed should be one which has a boiling point at atmospheric pressure less than about 85°C. Preferably, the material is a gas at ambient conditions, i.e., has an atmospheric boiling point of 25°C. or less. When urea is the fertilizer material, the medium should be free of any tendency to react with the urea of form adducts therewith, and, in this regard, all of the aforementioned materials should be satisfactory.

The volatile cooling medium is maintained as a liquid by refrigeration to a temperature below its boiling point at the pressure of the cooling step or as a pseudo-liquid by pressurization to a pressure at or slightly above its critical pressure. The temperature of the medium should be less than about 100°C. and, preferably, the temperature of the cooling medium is maintained less than about 20°C. Most preferably, the temperature is maintained less than about 0°C. to insure an adequate temperature differential for the cooling and solidification of the molten, water-soluble fertilizer material. Excessively low temperatures, however, are not desired unless necessitated by the choice of the material, e.g., liquefied air, nitrogen, etc., require a significantly low temperature, e.g., about −190° to −200°C., to maintain their liquefaction when atmospheric pressure is used for the solidification step.

The process is preferably performed at atmospheric pressure, particularly with the less volatile cooling media such as ammonia, the $C_4$ to $C_5$ alkanes, or their halogenated derivatives. If desired, however, the process can be performed at superatmospheric pressure such as pressures up to about 50 atmospheres. Since all of the aforementioned media have critical pressures that are not in excess of 70 atmospheres, and most have critical pressures less than about 50 atmospheres, there would be little or no advantage in use of pressures greatly in excess of these values. Preferred of pressures that could be used would be from 1 atmosphere up to and including the critical pressure of the medium. The particular pressure and temperature employed for the chilling step depends on the selection of the particular cooling medium so that a liquid or pseudo-liquid is present. Those skilled in the art can select the appropriate conditions and as an aid in this selection, the following table sets forth critical pressures for some of the media:

| Medium | Critical Pressure | |
|---|---|---|
| Air | 37.2 | atmospheres |
| Nitrogen | 33.5 | |
| Ammonia | 111.3 | |
| Carbon dioxide | 72.9 | |
| Methane | 45.8 | |
| Ethane | 48.2 | |
| Propane | 42.0 | |
| n-Butane | 37.5 | |
| i-Butane | 36.0 | |
| n-Pentane | 33.3 | |
| i-Pentane | 32.9 | |
| neo-Pentane | 31.6 | |
| Chloroform | 54 | |
| 1,1-Dichloroethane | 50 | |
| 1,2-Dichloroethane | 53 | |
| Difluoro-chloromethane | 48.5 | |
| Dichloromethane | 39.6 | |
| Ethyl bromide | 61.5 | |
| Ethyl chloride | 52 | |
| Ethyl fluoride | 49.6 | |
| Fluorodichloromethane | 51.0 | |
| Trichloromethane | 43.2 | |
| Methyl chloride | 65.9 | |
| Methyl fluoride | 58.0 | |
| Methylene bromide | 70.6 | |
| Methylene chloride | 60.0 | |
| Perfluoro-n-butane | 16.0 | |
| Propyl chloride | 45.2 | |
| Tetrafluorodichloroethane | 32.3 | |
| Trifluorochloromethane | 38.2 | |
| Trifluorotrichloroethane | 33.7 | |

Of the aforementioned, the following have critical temperatures less than 80°C.:

| Medium | Critical Temperature |
|---|---|
| Air | −141°C. |
| Nitrogen | −147 |
| Methane | −147 |
| Ethane | −82 |
| Propane | 32 |

Use of the aforementioned superatmospheric pressures permits practice of the invention without use of excessively low temperatures. The cooling media can also be employed in their pseudo-liquid state, i.e., at pressure equal to or slightly above their critical pressures and at a temperature at or above their critical temperatures. When carbon dioxide is used, it should be at a temperature above its triple point temperature, i.e., above −56°C., and at a liquefying pressure, i.e., from about 5 atmospheres up to and including its aforelisted critical pressure.

The cooling media can be maintained at the aforementioned temperatures by suitable refrigeration. This refrigeration can be performed by use of internal cooling coils through which a refrigerant can be circulated, or by withdrawing some of the medium in gaseous or liquid state, refrigeration of the withdrawn medium and recycling the refrigerated liquid medium chilling step.

The water soluble fertilizer is permitted to remain in the cooling medium for a sufficient time to insure solidification of the material. While the duration of its residence in the cooling medium depends somewhat on the temperature differential between the body of the cooling liquid and the freezing point of the water soluble fertilizer, in general, residence times from about 0.1 to about 2.0 minutes, and preferably from about 0.5 to about 1.0 minute, are adequate to insure solidification of the material. Residence times of longer duration are entirely operable and can be used if desired; however, it is preferred to separate the solidified fertilizer material from the cooling medium shortly after its solidification, thereby insuring against any possible contamination of the product.

Various techniques can be used to effect the separation such as decanting of the cooling liquid from the solids, filtration of the suspension of solids in the chilling medium, centrifuging of the suspension, etc.

The solids which are removed from the contact with the cooling medium and permitted to warm to ambient temperature and any trace of occluded or absorbed liquid will evaporate at the ambient conditions, leaving a pure product. In interests of efficiency of the process, the cold solids which are removed from contact with the cooling medium can be warmed by contacting with vapors of the colling medium that are recovered for recycling to the chilling step or which are supplied as fresh material to the operation. Thus, when the process employs liquefied air, ammonia, carbon dioxide or nitrogen, the cold solids removed from the chilling step can be contacted with fresh or recycled quantities of the gas at ambient temperatures to cool the gas and to raise the temperature of the solids to ambient conditions. Similarly, when the cooling medium comprises a valuable commodity such as the aforementioned alkanes and halogenated derivatives thereof and the chilling step is performed performed at a pressure less than the critical pressure of the medium, the vapors which are volatilized as a result of contacting between the molten fertilizer material and the chilling medium can be recycled to a refrigeration step for return to the process as additional cooling medium. These vapors, prior to their compression and refrigeration, can be contacted with the prilled solids removed from the chilling step to warm the solids and thereby improve the efficiency of the process.

The solids produced in the process can be obtained in a wide variety of sizes since there is no limit to the time of contact between the solids and the liquid cooling medium. Preferably, products having a weight majority of particles, e.g., about 51 to 70 weight percent, with an average diameter from 0.04 to 0.30 inch are produced. When large particles are desired for uses such as forest fertilization, particles with sizes from 0.13 to about 0.25 inch can be produced. The more conventional size wherein the weight majority of particles have an average diameter from 0.06 to about 0.13 inch can also be produced.

The solid particulate material produced by the process can then be classified in a conventional manner by passage over a series of screens to separate solids having an undesirably low average diameter, e.g., particles having diameters less than the minimum values of the aforesaid size ranges. These undersized particles can be recycled to the process by their introduction into the molten stream of material prior to its spraying into contact with the cooling medium. The particles having the desired range of average diameters can be separated as products, and particles which are over sized, i.e., which have particle diameters in excess of the maximum values of the aforesaid ranges, can be returned to the molten stream of material and melted therein, or can be passed to a grinder for comminution and the comminuted product can be returned to the screens for further segregation.

The following will illustrate a laboratory technique for the practice of the invention:

Liquefied nitrogen is placed in a one-gallon dewar container and a glass funnel that has its stem pulled to a reduced diameter orifice of about 0.025 inch is placed over the dewar flask. Molten urea is poured into the funnel so that the pressure head of molten urea in the funnel is sufficient to cause the urea to drip from the stem in the form of discrete droplets. The droplets fall into the liquid nitrogen and are immediately cooled and solidified therein to produce prills of urea. Funnels having various orifice sizes can be employed to produce a wide variety of sizes of urea prills in this method. In another experiment, dimethylol urea is added to the molten urea at concentrations of 0.5, 1.0, 3.0 and 5.0 weight percent.

The urea formed in each of the separate tests is separated from the liquid nitrogen, screened and samples of the prills are rested in a standard caking test.

The following Table summarizes the results of the caking tests:

TABLE

| Experiment | Wt. % Dimethylol Urea | Caking Results 24 Hours | 48 Hours |
| --- | --- | --- | --- |
| 1 | 0 | 4 | 4 |
| 2 | 0.5 | 3 | 3 |
| 3 | 1.0 | 3 | 3 |
| 4 | 3.0 | 2½ | 1 |
| 5 | 5.0 | 1 | 1 |

When urea which has been formed in a conventional prilling tower is subjected to the same caking tests, the numerical rating of the caking result after 24 hours is 6, indicating a highly caked and unsuitable product. In this test, product having a caking tendency on the numerical scale of about 4 to less is satisfactory for most commercial applications, and having a rating of 3 or less has exceptional resistance to caking.

The preceding example is intended solely to illustrate a mode of practice of the invention and to demonstrate results obtainable thereby. It is not intended that this example be construed as unduly limiting of the invention. Instead, it is intended that the invention be defined by the steps, conditions and reagents, and their obvious equivalents, set forth in the following claims.

I claim:

1. The method for the production of particulate solids of a fertilizer material which comprises dispersing a spray of a substantially anhydrous, molten, fertilizer material selected from the class consisting of ammonium nitrate, ammonium sulfate, potassium chloride, potassium nitrate, urea and mixtures thereof, into discrete droplets and contacting, in a contacting zone, the droplets with a liquefied, volatile, cooling medium selected from the group consisting of liquefied air, nitrogen, ammonia, carbon dioxide, $C_1$ to about $C_5$ alkanes and halogenated derivatives thereof having an atmospheric pressure boiling point of 25°C. or less and in which said fertilizer material is inert, insoluble and substantially non-absorptive, maintaining said cooling medium at a temperature less than about 100°C. and at a pressure at least sufficient to liquidify said medium at said temperature, permitting said droplets to remain in contact with said cooling medium for a sufficient time to cool said droplets to below the freezing point of said material and form said particulate solids with an average particle diameter from 0.04 to 0.30 inch, and separating said solids from said cooling medium.

2. The method of claim 1 wherein the temperature of said medium is maintained below its critical temperature.

3. The method of claim 2 wherein said cooling medium is maintained at a temperature less than about 20°C.

4. The method of claim 3 wherein said fertilizer material is urea.

5. The method of claim 3 wherein said cooling medium is liquefied air.

6. The method of claim 2 wherein said cooling medium is a $C_1$ to about $C_5$ alkane hydrocarbon.

7. The method of claim 1 wherein said discrete droplets are subdivided sufficiently to form particulate solids with a weight majority thereof having an average diameter of from 0.13 to 0.25 inch.

8. The method of claim 1 wherein said cooling medium is carbon dioxide and said cooling medium is maintained at a temperature above −56°C. and at a pressure from 5 to about 72.9 atmospheres.

9. The method of claim 1 wherein vapors of said cooling medium are withdrawn from said contacting zone, recycled to a refrigeration step, refrigerated and returned to the process as a cooled liquid.

10. The method of claim 9 wherein said solids removed from contact with the cooling medium are contacted with said vapors removed from said contacting zone before their refrigeration.

11. The method of claim 4 wherein said discrete droplets are subdivided sufficiently to form particulate solids with a weight majority thereof having an average diameter from 0.04 to 0.30 inch.

12. The method of claim 11 wherein said droplets are formed with sizes from 0.13 to about 0.25 inch.

13. The method of claim 1 wherein the solids removed from the contacting are passed over a series of screens to separate particles therefrom having a diameter less than said average diameter and the separated particles are returned into admixture with said molten fertilizer material prior to its spraying into contact with the cooling medium.

* * * * *